United States Patent [19]

Fitts

[11] Patent Number: 5,319,445
[45] Date of Patent: Jun. 7, 1994

[54] HIDDEN CHANGE DISTRIBUTION GRATING AND USE IN 3D MOIRE MEASUREMENT SENSORS AND CMM APPLICATIONS

[76] Inventor: John M. Fitts, 528 Euclid St., Santa Monica, Calif. 90402

[21] Appl. No.: 941,710

[22] Filed: Sep. 8, 1992

[51] Int. Cl.$^5$ ............................................. G01B 11/24
[52] U.S. Cl. .................................. 356/376; 250/237 G
[58] Field of Search ................................ 356/376, 375; 250/237 G, 227 G

[56] References Cited

U.S. PATENT DOCUMENTS

| | | |
|---|---|---|
| 3,166,624 | 1/1965 | Vargady . |
| 3,627,427 | 12/1971 | Johnson et al. . |
| 3,943,278 | 3/1976 | Ramsey, Jr. . |
| 4,051,483 | 9/1977 | Suzuki . |
| 4,070,683 | 1/1978 | Altschuler et al. . |
| 4,212,073 | 7/1980 | Balasubramanian . |
| 4,273,448 | 6/1981 | Schiler . |
| 4,525,858 | 6/1985 | Cline et al. . |
| 4,577,940 | 3/1986 | Krasinski et al. . |
| 4,664,470 | 5/1987 | Yerazunis . |
| 4,675,730 | 6/1987 | Adomaitis et al. . |
| 4,794,550 | 12/1988 | Greivenkamp, Jr. . |
| 4,810,895 | 3/1989 | Kafri et al. . |
| 4,813,761 | 3/1989 | Davis et al. . |
| 4,814,601 | 3/1989 | Jones . |
| 4,818,108 | 4/1989 | Eppinger . |
| 4,836,681 | 6/1989 | Van Saders et al. . |
| 4,842,411 | 6/1989 | Wood . |
| 4,850,673 | 7/1989 | Velzel et al. . |
| 4,850,693 | 7/1989 | Deason et al. . |
| 4,867,570 | 9/1989 | Sorimachi et al. . |
| 4,872,757 | 10/1989 | Cormack et al. . |
| 4,874,941 | 10/1989 | Spillman, Jr. . |
| 4,874,955 | 10/1989 | Uesugi et al. . |
| 4,877,970 | 10/1989 | Minamikawa et al. . |
| 4,887,899 | 12/1989 | Hung . |
| 4,895,434 | 1/1990 | Stern et al. . |
| 4,895,448 | 1/1990 | Laird . |
| 4,900,144 | 2/1990 | Kobayashi . |
| 4,904,084 | 2/1990 | Geary . |
| 4,928,169 | 5/1990 | Leberl et al. . |
| 4,929,083 | 5/1990 | Brunner . |
| 4,939,368 | 7/1990 | Brown . |
| 4,939,380 | 7/1990 | Berger et al. . |
| 4,948,258 | 8/1990 | Caimi . |

OTHER PUBLICATIONS

"Fourier-Transform Method of Fringe-Pattern Analysis for Computer-Based Topography and Interferometry", by Takeda et al., J. Opt. Soc. Am/vol. 72, No. 1, Jan. 1982, pp. 156-160.
"Fourier Transform Profilometry for the Automatic Measurement of 3-D Object Shapes", by Takeda et al., Applied Optics, vol. 22, No. 24, Dec. 15, 1983, pp. 3977-3982.
"Automated Phase Measuring Profilometry of 3-D Diffuse Objects", by V. Srinivasan, et al., Applied Optics, vol. 23, No. 18, Sep. 15, 1984, pp. 3105-3108.

Primary Examiner—Richard A. Rosenberg
Attorney, Agent, or Firm—Hill, Steadman & Simpson

[57] ABSTRACT

A high-speed three-dimensional surface measurement system for use in determining the surface of an object from at least one electronic signal produced by a mini-moire sensor. At least one light source illuminates at least a surface area of the object with at least one fringe pattern. The light source has a hidden change distribution grating or matrix of gratings for producing the fringe pattern. The grating has hidden variations distributed substantially across the grating. The grating has a pseudo-random grating pattern in which a nominal fringe pattern has a small uniform period with the hidden variations distributed statistically across the grating. The hidden variations are so small that at any one point on the grating a noise-like value of the hidden variations is on the order of an overall noise equivalent phase value. A CCD camera receives reflected illumination from the surface area and provides an electronic signal representative of reflected illumination received thereby.

35 Claims, 7 Drawing Sheets

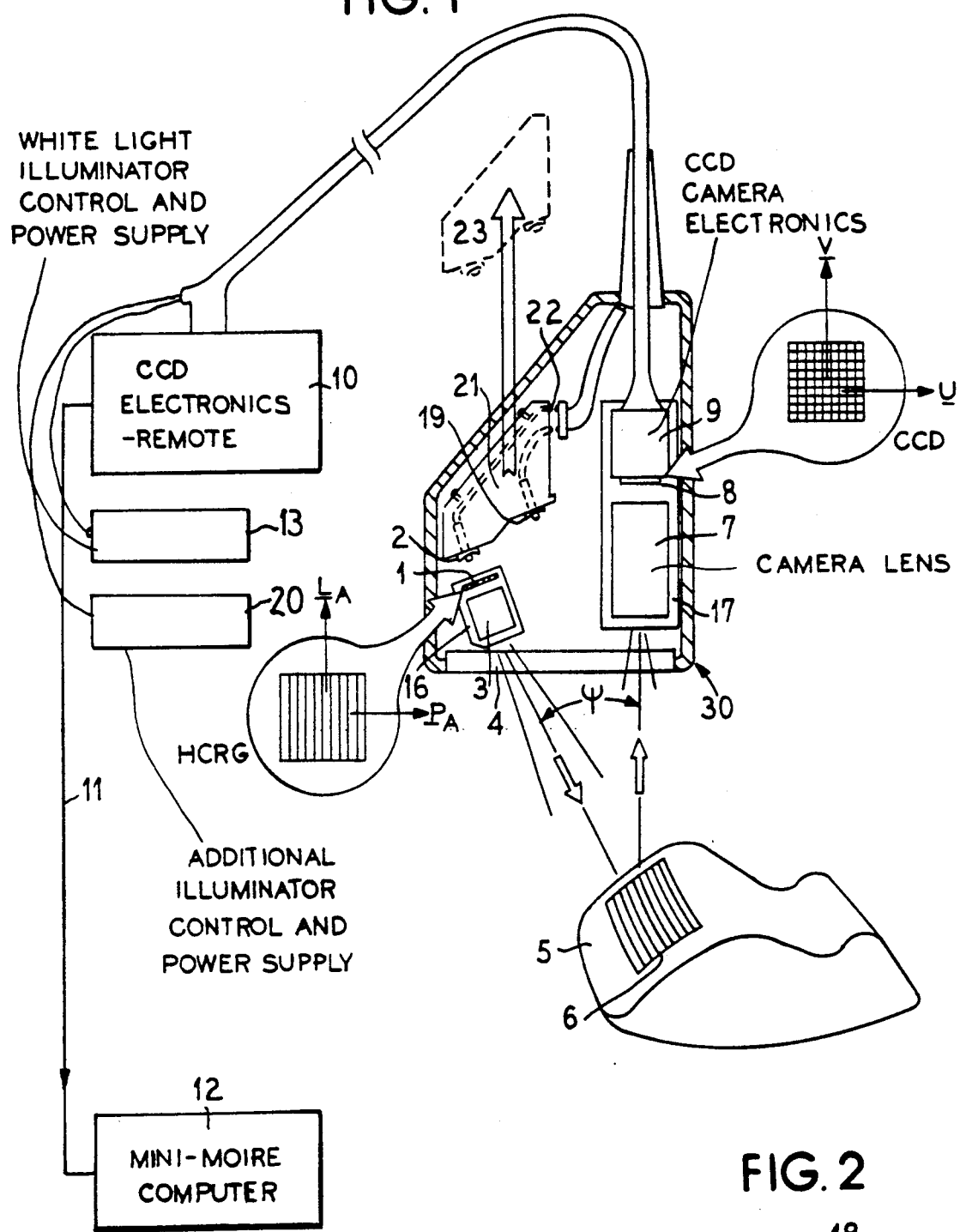
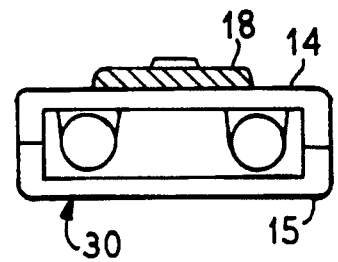

HIDDEN CHANGE DISTRIBUTION GRATING AND USE IN 3D MOIRE MEASUREMENT SENSORS AND CMM APPLICATIONS

BACKGROUND OF THE INVENTION

The present invention is directed to miniaturized X-Y-Z data collection devices and systems. The present invention is directly applicable to many important surface inspection and measurement tasks that have not been successfully or practically accomplished in the prior art because of overly-large 3D measurement sensor sizes and/or costs.

In the prior art, the fundamental X-Y-Z data collection sensors were based on small single-point contact touch probe technologies. A major off-line measurement industry was created using these sensors incorporating equipment known as Coordinate Measuring Machines (CMM's). These CMM's generally consist of mechanical slides or linear motions to provide a three degree-of-freedom (3-D.O.F.) translation of the small sensor relative to the part being inspected. In many CMM configurations a two-axis rotational unit known as a pan/tilt head is attached between the quill or mast of the CMM and the sensor to provide an additional two degree-of-freedom (2-D.O.F.) rotation to the sensor for part measurement flexibility. Some CMM versions will also include translations and rotations to help manipulate the part.

Due to its importance to the off-line measurement industry (the measurement of parts off the assembly line), the CMM has a long and successful development history. More than 40 years have permitted the perfection of the CMM to maximize reliability and measurement accuracies while minimizing costs. Standardization of a number of CMM versions has been achieved. Their proliferation has been so great that virtually every manufacturing facility that is required to meet some quality control standard has at least one CMM version in operation.

The success of the CMM has also created a major paradox in the measurement industry in meeting current and future goals. One side of the paradox is that the CMM was designed and developed to hold small light weight measurement sensors weighing only a few ounces. However these sensors were generally of a single point type (i.e. only one X-Y-Z data measurement point is available for each motion of the CMM). The resulting data collection times are so slow that the accelerating requirements of higher speed inspection and measurement needed to meet new manufacturing quality control goals cannot be met with these single-point sensors. The small advancement of the single-point sensor from a contact type to a single-point non-contact type has not addressed the new data collection speed requirements which are forecasted to be 100% inspection at on-line production rates.

The other side of the paradox is that current stand-alone sensors designed to generate large X,Y,Z data arrays in one view are much too large and heavy to be mounted on existing CM's. The investment cost and risk of replacing the traditional well-proven CMM in order to use these sensors are so great as to have severely handicapped the measurement industry in attempting to achieve its quality control goals.

SUMMARY OF THE INVENTION

A moire sensor technique U.S. Pat. No. 5,175,601 hereby incorporated by reference) has provided a general approach to collecting large X-Y-Z data bases at data rates sufficient to meet the measurement industry goals. This disclosed moire sensor technique has the ability to collect data much more rapidly than either single point or single line (laser line scanning) techniques and has the ability to collect extremely dense X-Y-Z data (e g approximately 250,000 X-Y-Z data points in a 480 ×512 grid for a typical solid state CCD video camera) in snapshot view of the part. Higher density data is achievable with cameras with higher density detector arrays. This disclosed moire technique does not require the moire sensor to be held stationary with respect to the part for data collection, thereby permitting the achievement of high speed data collection for the measurement industry.

A miniature moire (Mini-Moire) sensor in its smallest configuration and with the highest speed response would contain thte following minimal size-impacting elements listed in Table 1:

TABLE 1

MINIMAL SIZE-IMPACTING ELEMENTS FOR THE MINI-MOIRE SENSOR

1) One 2D CCD Detector Element Array
2) One Lens for CCD
3) One Fringe Pattern Element
4) One White Light Source for Projector
5) One Lens for Projector Additional elements could results in a potentially larger and more expensive moire sensor. The ultimate performance features desired of a miniature moire sensor are the same as those achieved by the reference U.S. Ser. No. 775,432 and are listed in Table 2.

TABLE 2

DESIRED FEATURES FOR THE MINI-MOIRE SENSOR

ITEM I - Use highest resolution Fringe Pattern Element possible with a Nyguest Limit fringe period $p_o$ for highest resolution x,y,z measurements and coverage of smallest part areas.
ITEM II - Solve $2\pi$ Problem in same snapshot instant of CCD image collection in order to support high speed part scanning including continuous scans.
The "$2\pi$ Problem" is the shift of a fringe pattern a full period to create a new identical looking pattern indistinguishable using standard interferometric fringe processing techniques.

Items I and II are in direct conflict with each other and moire sensor implementations have compromised either I or II (and often both) except for the embodiment depicted in U.S. Ser. No. 775,432 which has comprised size (Item III). The moire sensor techniques that are currently used are itemized in Table 3 according to which Item I, II, or III is compromised.

TABLE 3

CURRENT MOIRE TEHNIQUE GROUPED ACCORDING TO DEFICIENCIES

| TECHNIQUES THAT COMPROMISE ITEM I AND NOT ITEMS II | TECHNIQUES THAT COMPROMISE ITEM II AND NOT ITEM I | TECHNIQUES THAT SOLVE ITEMS I & II BUT COMPROMISE SIZE (ITEM III) |
|---|---|---|
| A. Fringe Patterns with Optical Tags and Fiducials (U.S. Pat. No. 4,867,570) | D. Sequential Switching of Patterns at Pattern Element (U.S. Pat. No. 4,874,941, U.S. Pat. No. 5,175,601) | X. Use of two or more CCD camera arrays to simultaneously view high resolution fringe pattern with no tags (U.S. Pat. No. 5,175,601) |
| B. Large Period Patterns (U.S. Pat. Nos. 4,842,411, 4,895,448) | E. Sequential Switching of multiple projectors (EOIS MK VII Moire Sensor) | |
| C. Gauge only large smooth surfaces and count or track each fringes through "fringe reconstruction" on smooth unbroken (U.S. Pat. No. 4,273,448) | F. Moving Fringe (Phase Shift Interferometric) Method (U.S. Pat. Nos. 4,212,073, 4,742,237) | |
| | G. Sequential Changing or movement of lens elements. (U.S. Pat. Nos. 4,874,955, 4,818,108) | |

The key to eliminating the extra CCD elements is to use an improved fringe pattern element. Current fringe pattern designs use clearly visible and distinct optical marks, tags and fiducials which are implanted into a basic Ronchi grating or sinusoidal pattern of constant period. At each optical mask, the grating pattern is destroyed and x, y, z data in the immediate vicinity to the mark cannot be generated. In order to gauge small parts or areas, the optical marks are required to be more closely spaced, creating a greater loss of data. The less dense the mark spacing, the larger the part surface area needs to be to support fringe counting and reconstruction techniques. The multiple camera approach described in U.S. Pat. No. 5,175,601 eliminated the requirement of the distinct optical marks and tags in patterns.

It is an object of the present invention to eliminate the use of multiple cameras in order to obtain miniaturization and will eliminate the use of data-destroying marks and tags. The resultant is that the ideal miniature moire sensor will contain both the minimal elements discussed in Table 1 and the desired features in Table 2.

The present invention is a new fringe pattern element identified as the Hidden Change Distribution Grating (HCDG), the resultant miniature moire (Mini-Moire) sensor configurations, applications and extensions to other grating applications. An important special case of the HCDG is the Hidden Change Ronchi Grating (HCRG) and matrix versions.

The HCDG has all the properties of a high resolution linear fringe grating of small period $P_o$ without any distinguishable optical marks, tags or fiducials. Consequently x, y, z data can be generated using standard interferometric processing techniques throughout the full pattern without interference from optical marks traditionally used to solve the $2\pi$ Problem. The $2\pi$ Problem is solved because the HCDG design is based on hidden signal stochastic principles. The HCDG is a pseudo-random grating pattern in which the nominal fringe pattern is of a small uniform period $P_o$ (i.e. the ideal high resolution grating) to permit the high resolution generation of x, y, z data. "Hidden" variations in the HCDG pattern (as small as $p_o/100$) are distributed statistically across the grating. Known hidden signal statistical processing techniques are used to extract the grating fringe positions to solve the $2\pi$ Problem.

The key new property of the HCDG is that these fringe changes are made to be so small that at any one point on the grating its "noise-like" effect is on the order of the moire sensor Noise Equivalent Phase, $NEQ_\phi$. $NEQ_\phi$ is a measure of the effect of sensor image noise in terms of interferometric fringe pattern noisy phase shifts (e.g. $2\pi/100$ radians) Thus the accuracy of the x, y, z data generated by the HCDG remains essentially the same as that of the ideal uniform pattern of period (assuming that the $2\pi$ Problem was somehow solved for this ideal). The "energy" of the hidden modulation pattern is statistically distributed over the full HCDG. A matched filter operation over a processor-determined Integration Length permits the pattern location to be extracted from the fringe pattern image. The hidden pattern uniqueness over the HCDG will provide the necessary location uniqueness to solve the $2\pi$ Problem. The HCDG also permits this $2\pi$ Problem solution to occur at any point in the image where suitable fringes exist. Solutions are not relegated to predetermined tag locations of conventional marking techniques.

The HCDG used in fixed moire processing will accommodate all surfaces except "knife" edges that are parallel to the pattern linear bands. Therefore, the HCDG is extended to a Hidden Change Distribution Matrix (HCDM) pattern to accommodate this anomaly. The HCDM pattern generally consists of two HCDG patterns oriented at right angles to each other. An extension to a Polarization Sensitive HCDM (PS-HCDM) is also presented to permit simpler processing than that for the HCDM.

The invention of the HCDG and HCDM now permit the minimal configuration possible for the Mini-Moire Sensor. Miniaturizations are available for each of the following components which make up the sensor.

1) Miniature CCD Array
   Detached Electronics
2) CCD Lens and Holder
3) Projector Lens and Holder
4) Glass Slide: HCDG or HCDM or Variations
   —Mounts in Projector Holder
5) Miniature Light Bulb and Heat Sink Holder
   Strobe or Continuous
   Detached Power Supply
   Miniature Size Eliminates Condenser Lens Requirement
   Fiber Optic Options to remote bulbs are also possible
6) Window: Glass, Plastic, Safety Glass, etc.
7) Two Piece Case: Metal, Ceramics, Composites, etc.
   1 Piece Bottom Half to Serve as Optically rigid Structure for Mini-Moire Sensor Components
   —1 Piece Top Half to Provide Access Ports to Components and to Provide Strain Relief Support at Cable Exit Position between Matching Halves Several embodiments and variations of the Mini-Moire Sensor include an added white light source, polarization control light source, extra projector, extra CCD lens grating, etc.

The Mini-Moire Sensor is capable of providing high-density 3D moire images of a part at image frame rates compatible to typical CMM motions. The CMM, however, is only required to provide mechanical moves between image footprints rather than at every single X-Y-Z data point. The Mini-Moire Sensor will also permit continuous CMM motions to cover the part without stopping. In order to take advantage of the Mini-Moire Sensor and to avoid overly costly computers or computer technologies that are not reliable or readily available, the invention includes an architecture for the Mini-Moire Computer. This architecture separates the functions of high speed image storage, raw x-y-z data processing and application software. The architecture permits the maximum part scan speeds possible with the fastest throughput of data to the end user.

The invention includes a new CMM application unachievable with other technologies. Conventional CMM's perform measurements only after script files are generated through manual "Teach" modes or CAD-Aided Teach modes. The measurements are then taken by the CMM. If at a later time another measure is required, then the labor intensive and time consuming cycle of Teach and Gauge is repeated. The Mini-Moire Sensor can now be mounted on the CMM for extremely fast data gathering and continuous scan capability. The new CMM application is for the part to be fully scanned by the CMM and Mini-Moire Sensor in an automatic mode avoiding labor-intensive and time-consuming Teach Modes. The availability of a full x, y, z data base permits the measurements of the part to be made, potentially in a CAD analysis software environment, after data collection. No measurement decisions are required before part measurement. Thus changes in measurement strategies, and requirements can be made on an existing data base and does not require repeating the cycle of Teach and Gauge resulting in unnecessary usage of the CMM.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a schematic diagram of the basic Mini-Moire Sensor configuration utilizing the Hidden Change Ronchi Grating (HCRG) to achieve high speed, high resolution, large depth of range for 3D surface mapping and gauging;

FIG. 2 is a front view of the FIG. 1 Mini-Moire Sensor;

DESCRIPTION OF THE PREFERRED EMBODIMENT

Figure 3:
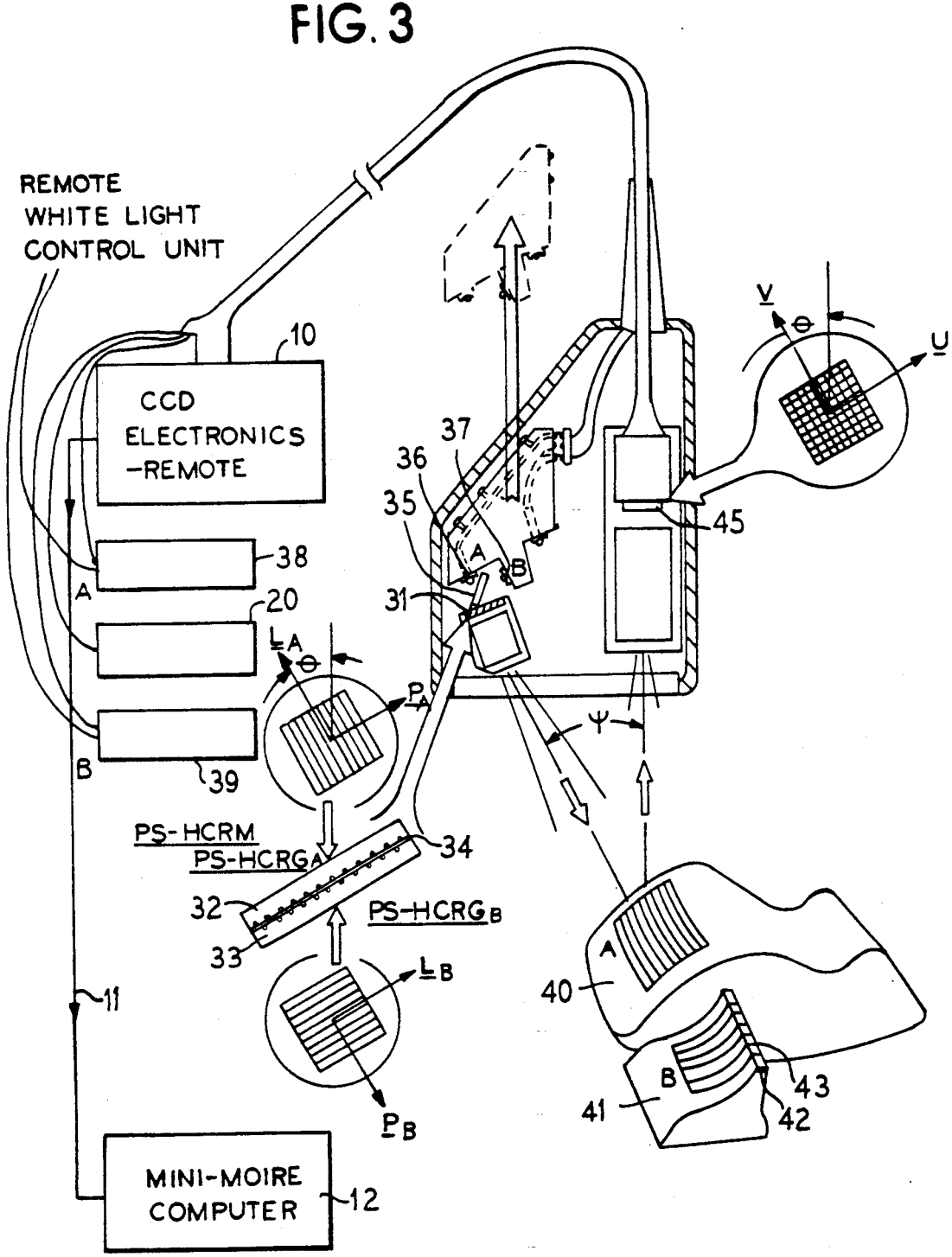
FIG. 3 is a schematic diagram of an extended-capability Mini-Moire Sensor with a Polarization Sensitive - Hidden Change Ronchi Matrix (PS-HCRM) element to accommodate parts with "knife edges" through polarization light control.

The theory of the Hidden Contrast Distribution Grating (HCDG) has general applicability, but there are three versions of the HCDG that exist that have the most advantage in high speed, 3D Miniature Moire "Mini-Moire" Measurement Systems as depicted in FIGS. 1 through 4.

The basic Mini-Moire Sensor of the present invention is illustrated in FIGS. 1 and 2. A key element of this system is the Hidden Change Ronchi Grating (HCRG) which permits the minimal components of the Mini-Moire Sensor. It also permits the highest resolution x-y-z data, the largest measurement range (i.e. variation of measurement depth), and the ability for virtually instant data collection without delays due to multiple imaging and multiple projector requirements. The HCRG is illuminated by a white light bulb/reflector unit which projects the HCRG pattern through the projector imaging lens through the Mini-Moire window to the part. In this preferred embodiment of the Mini-Moire design, a condenser lens between the white light bulb 2 and the HCRG 1 is eliminated due to the construction of the bulb internal reflector optics. The light source can be either a CW light bulb for continuous operation, or a strobe bulb for flash illumination in a high speed moving environment. This Mini-Moire design will also accommodate bulbs with both a continuous and strobe capability. The image of the HCRG pattern is diffusely reflected from the surface of the object 5, for collection by the CCD camera imaging lens for reimaging on the CCD array. The on-line CCD camera electronics relays the electronic signal of the 2D image to the remote CCD electronics. For typical CCD arrays and camera electronics 9 and 10, and video transfer link the transfer rates occur at approximately 33 frames/second or approximately 0.33 milliseconds per CCD image. In remote CCD electronics 10 the video electronics are further amplified and transferred to the remote Mini-Moire Computer. The basic embodiment of the Mini--Moire Sensor utilizes the properties of the HCRG to collect all necessary data in one "snapshot" view of patch 6 so that full x-y-z surface information can be generated by the Mini-Moire Computer.

In the preferred embodiment, the camera electronics 9 and 10, will contain electronic shutters in which imagery can be frozen into the CCD array, Item 8, in 0.001 seconds or less. This permits high speed relative motion between the Mini-Moire Sensor 30 and the object 5. Strobe illumination has the advantage of providing intense illumination in 10 microseconds or less. The white light illuminator control and power supply 13, are also remote from the bulb 2.

The primary elements of the Mini-Moire Sensor are mounted in a molded case consisting of two halves: an optical-bench half 14 and a cover half 15. The optical-bench half 14 is an optically and thermally ridged structure for the direct mounting of the projector optics bracket 16 and the camera optics bracket 17. Also directly connected to the external portion of the optical-bench half 14 is the Mini-Moire connection bracket 18 for the Coordinate Measuring Machine (CMM) interface or other external mechanical interface. The cover half 15 is primarily intended as a dust cover and protection aid and is reduced in weight to insure a light weight Mini-Moire Sensor Package.

In the preferred embodiment of the Mini-Moire Sensor in FIG. 1, an additional white light illumination bulb 19 is included. This bulb 19, with its internal reflection optics, will project white light onto the object 5, in the patch area 6. No imaging optics are required for this white light illumination, thereby minimizing the weight and size impact of the bulb 19 which can be either continuous or strobe. The white light illumination in the absence of the HCRG fringe pattern can provide 2D information to the CCD array 8 for other image processing functions. In certain cases, the white light illuminator will provide information useful for moire processing including sharp intensity changes in the part reflectance pattern. The illuminator control and power supply 20 for the bulb 19 are located remote from the Moire Sensor.

In the preferred embodiment of the Mini-Moire Sensor in FIG. 1, maintenance ease and replacement of bulbs 2 and 19 is accomplished. Each bulb is easily inserted into receptacles in a bulb mount/heat sink 21. The wire connections for the bulbs, 2 and 19, are interfaced from the heat sink 21 to the case of the Mini-Moire Sensor 30 through sliding contact connections 22. This permits the heat sink 21, with bulbs 2 and 19, to be easily extracted through the rear of the Mini-Moire Sensor 30 to an external location 23.

An important extension of the invention is the embodiment of the Mini-Moire Sensor with the element: The Polarization Sensitive —Hidden Change Ronchi Matrix (PS-HCRM) as depicted in FIG. 3. The PS-HCRM is divided into two polarization sensitive—Hidden Change Ronchi Gratings: PS-HCRG$_A$ 32 and PS-HCRG$_B$ 33. PS--HCRG$_A$ and PS-HCRG$_B$ are similar to standard Ronchi grating construction with clear and opaque bands except that the PS-HCRG$_A$ opaque bands are made of linearly polarized material so that the opaque bands only occur for polarization in the direction L$_A$. Similarly, the PS-HCRG$_B$ opaque bands are made of polarization material so that they become opaque only for polarization in the direction L$_B$. The PS-HCRG$_A$ and PS-HCRG$_B$ patterns are located back-to-back at an interface 34, to insure focus under white light illumination. Polarization control is accomplished by the linear polarizer 50%/50% window 35, situated between the PS-HCRM 31, and the Pattern A illuminator bulb 36 and the Pattern B illuminator bulb 37. The remote white light control units 38 and 39, will provide the appropriate switching between the light sources to provide illumination of either Pattern A or Pattern B. As in the Mini-Moire Sensor configuration embodiment, FIG. 1, Pattern A is the primary pattern of illumination for general objects 40. Pattern B is only used for special objects 41, which contain knife edges 42, oriented along the Pattern A fringe dimensional L$_A$. For this condition, the fixed Pattern A does not provide enough fringes across the knife edge surface area 42, to generate sufficient imagery data for moire processing. However by being able to switch to Pattern B through the use of the PS-HCRM 41, fringes now will occur across the knife edge 42, in the form of a fringe pattern, 43, that can be processed if sufficient triangulation exists between the Pattern B line-of-sight and the camera line-of-sight. In order to insure triangulation, the PS-HCRM 41, is rotated at an angle $\Theta$ between 0° and 45°. Generally to insure maximum triangulation between the more common Pattern A and the camera line-of-sight, the angle $\Theta$ is generally less than 30°. The fringe pattern imagery is collected by the CCD array 45, for moire interferometric data processing. The PS-HCRM 41 has permitted this function to occur without the addition of a second projector imaging optics and fringe pattern element. The PS-HCRM 41 has also permitted the same basic number of elements, except for the addition of a small illuminator bulb 37, to be used as in the basic Mini-Moire package of FIG. 1. Therefore all the features of the Mini-Moire package including weight, small size and maintainability are the same between the embodiments of FIG. 1 and FIG. 3.

Figure 4:
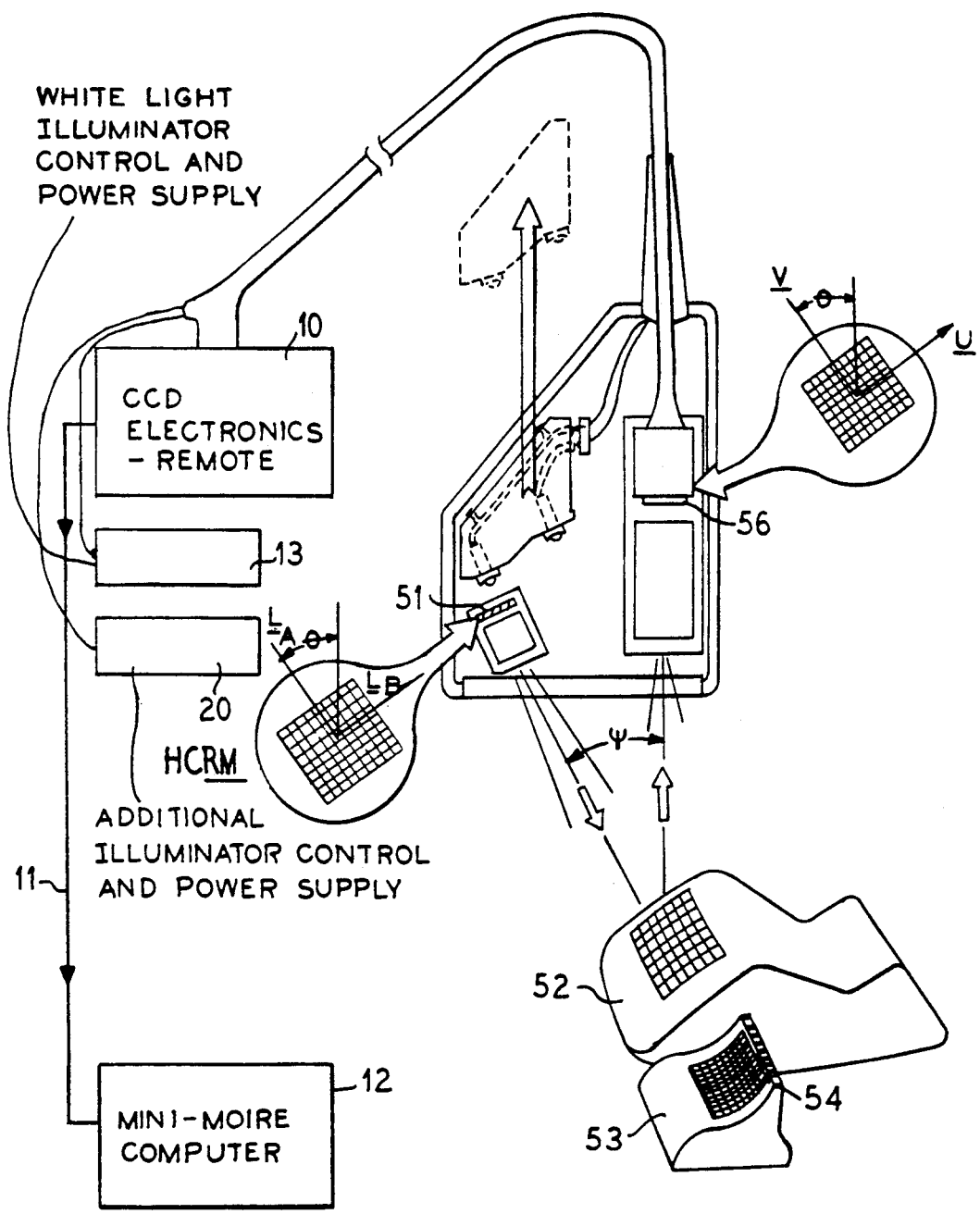
FIG. 4 is a schematic diagram depicting a Mini-Moire Sensor with a Hidden Change Ronchi Matrix (HCRM) in which no light switching is required to accommodate objects with knife edges.
Figure 5A:
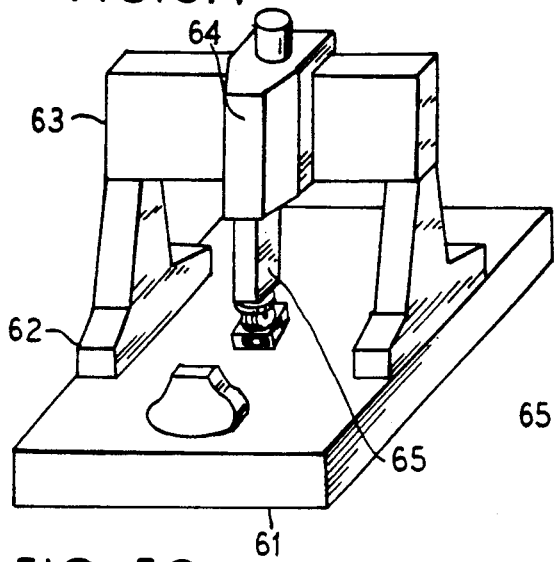
FIGS. 5A–5E illustrate the Mini--Moire Sensor Subsystem embodiment for converting conventional Coordinate Measuring Machines (CMM's) to high speed 3D measurement and mapping systems.
Figure 5B:
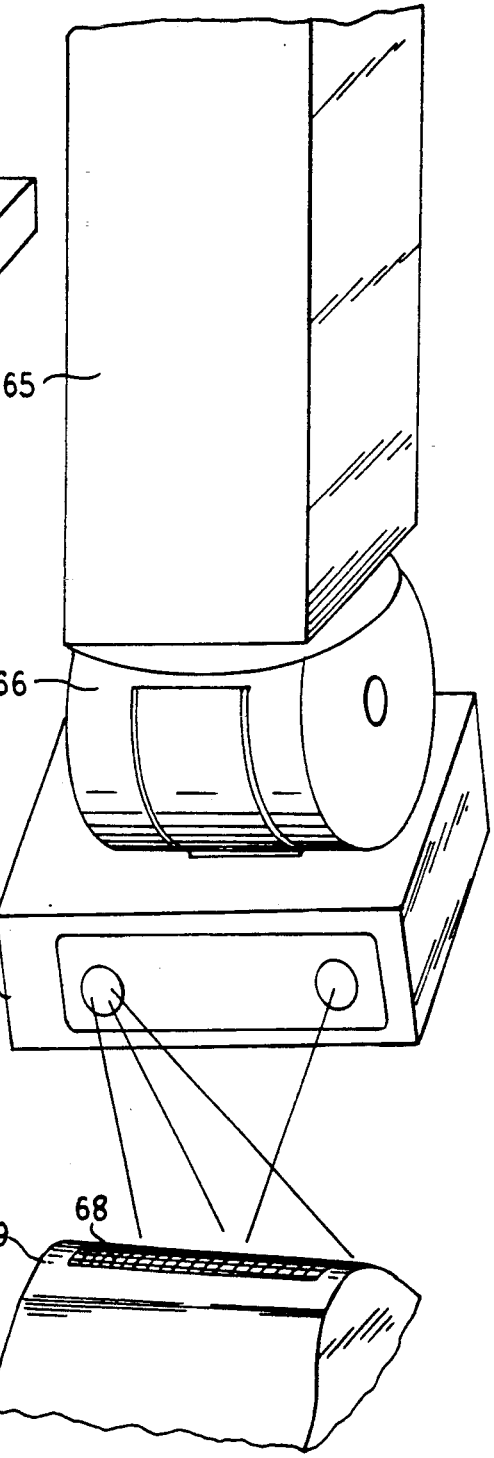
Figure 5C:
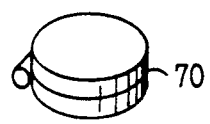
Figure 5D:
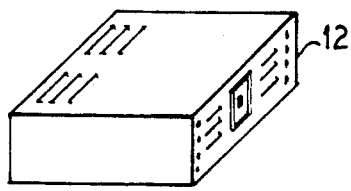
Figure 5E:
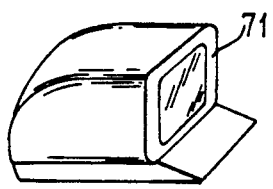

A third extension of the Mini-Moire Sensor utilizes the Hidden Change Ronchi Matrix (HCRM) without polarization control as depicted in FIG. 4. The HCRM 51 is projected directly to object surfaces 52 and 53. Two crossing patterns are simultaneously provided by the HCRM 51 for all object surfaces including knife edges 54. As for the PS-HCRM embodiment of FIG. 3, an angle $\Theta$ is used to insure triangulation of fringe Patterns A and B for moire processing. The processing requirements are more complex for the HCRM then for the HCRG. There is a significant advantage if Pattern A and B decoupling occurs by rotating the CCD array 56, the same angle $\Theta$. The advantage of this Mini-Moire embodiment utilizing the HCRM over that of the PS-HCRM in FIG. 3, is that no switching of light sources is required between objects. Therefore there is no decision process required in an automatic scan operation where the pattern (Pattern A or Pattern B) is dependent on the part surface characteristics. The use of the HCRM in this Mini-Moire embodiment results in exactly the same number of elements as for the basic Mini-Moire Sensor depicted in Figure 1. Therefore all features of the FIG. 1 embodiment hold for the FIG. 4 embodiment.

The preferred embodiment of the invention of converting a conventional Coordinate Measuring Machine (CMM) to a high speed X-Y-Z data gathering device is shown in FIG. 4. CMM's such as CMM 61 are in vast proliferation in the U.S. industry and are a catalogue item stock from a number of CMM manufacturing companies. The CMM's generally have the property of being highly accurate, but extremely slow in the gauging because of the single point touch probe technology that is utilized. However these CMM's do have the ability to rapidly move the X-axis element 62, Y-axis element 63 and Z-axis element 64 rapidly between touches. The key interface point to the CMM is the quill 65, or mast of the CMM. Attached to this mast 65, is a pan/tilt head 66, that is also readily available in a number of configurations from different manufacturers. The invention of the Mini-Moire Sensor 30 in the embodiments of FIGS. 1-4 permits the Sensor 30 to be directly mounted to the pan/tilt head 66. The invention of the Mini-Moire Sensor 30 also permits the collection of sufficient imagery footprints 68, in time intervals as short as 0.001 seconds to permit rapid data collection. The Mini-Moire Sensor 30 permits the continuous scan of this footprint 68, by the CMM 61, so that the interruptive stopping of the CMM to make measurements is eliminated. Orientations of the pan/tilt unit 66, permit the full part 69 to be gauged from all angular aspects. This results in the change of a CMM from an occasional product Validation Mode to a potential 100% on-line high speed Gauge Mode. The speed enhancement is further increased through the addition of a removable rotary table 70. This rotary table is able to support parts and eliminate the extensive X-axis and Y-axis motions of the CMM 61. The Mini-Moire Subsystem that would be used for a CMM upgrade or for a CMM-based system are the Mini-Moire Sensor 30 the Mini-Moire Computer 12, the Quick Look Display/Operator Interface 71 and the Optional Removable Rotary Table 70.

The invention of converting a conventional CMM to a high speed X-Y-Z gauging device also greatly simplifies the traditional CMM Train Mode. The Train Mode is the requirement to program the CMM prior to part gauging. In conventional CMM applications, this is a labor intensive operation in which the part measurements need to be known in advance of the programming of the Train Mode. Some extensions have been made so that training can occur automatically from a Computer Aided Design (CAD) file of known parts. The problems still exist for unknown parts in Reverse Engineering applications. However with either approach, if after the Gauge Mode, additional measurements are determined to be made, the requirement is to regenerate the train mode and regauge the part. The current invention now permits a completely new strategy in training parts. The unknown part (or known part) will be automatically scanned to generate a full X-Y-Z data surface map of the part without necessarily any regard to the measurements to be made. Referring to FIGS. 5A-5E, this rapid scan is a result of the Mini-Moire Sensor 30, being able to collect sufficiently high density moire imagery in single snapshot views during a continuous scan (or intermittent scan). This imagery is collected and processed in the Mini-Computer Architecture to generate a vast X-Y-Z data file for the part. However sufficient memory is currently available, or will be soon, to store this data conveniently. The operator after gauging can then generate the specific measurements that are needed. If at a later time additional measurements are required, the moire surface map X-Y-Z data file exists so that the measurements can be taken directly from the Mini-Computer data base and not require the time-consuming Train Mode and repeat of the part Gauging Mode. This will free the CMM to meet the requirements of a 100% inspection at on-line product manufacturing rates without unnecessary "down" time or usage.

Figure 6:
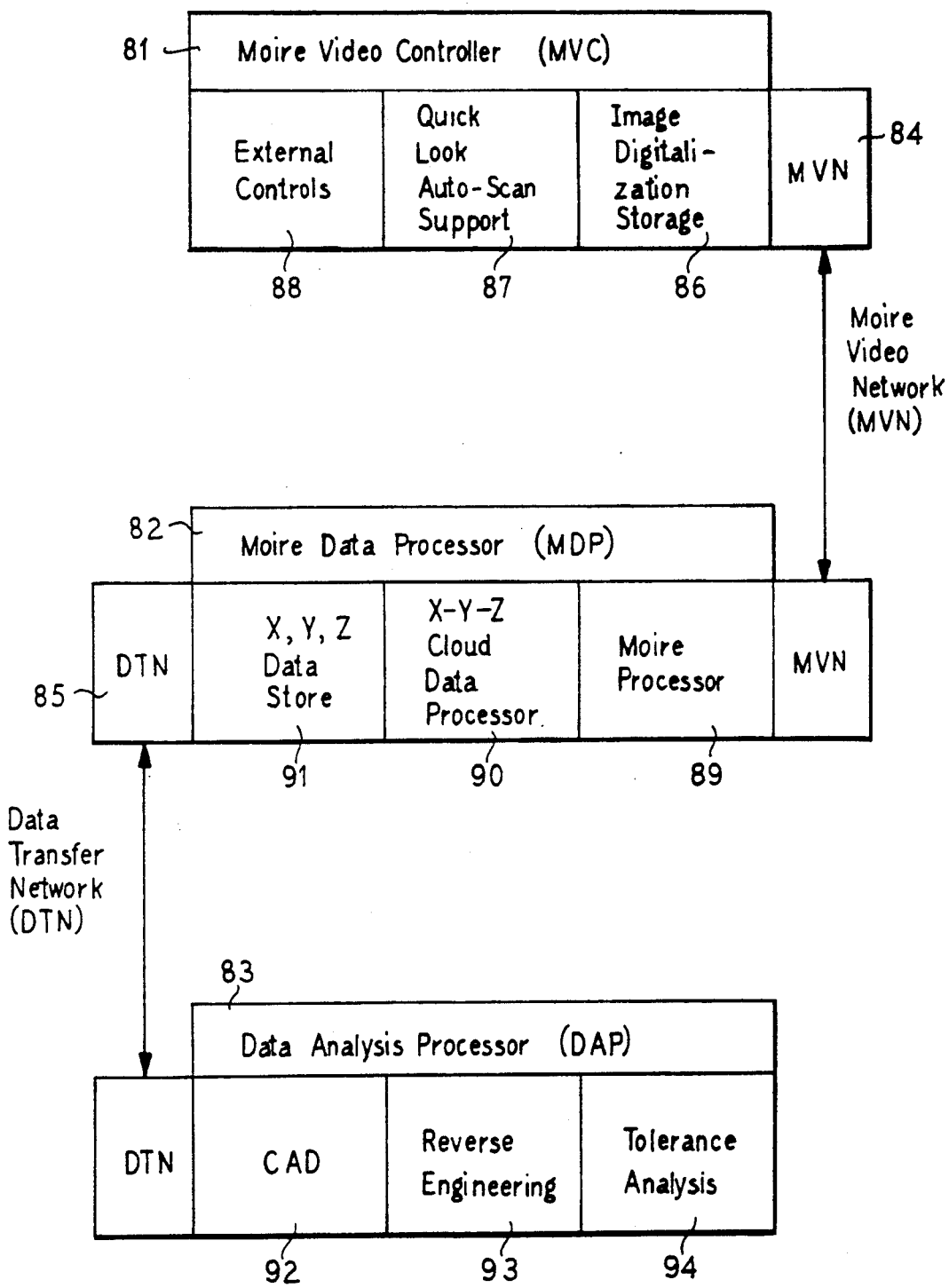
FIG. 6 is a block diagram of the Mini-Moire Computer Architecture embodiment to best support the high speed data collection capabilities of the Mini-Moire Sensor configurations.
Figure 7A:
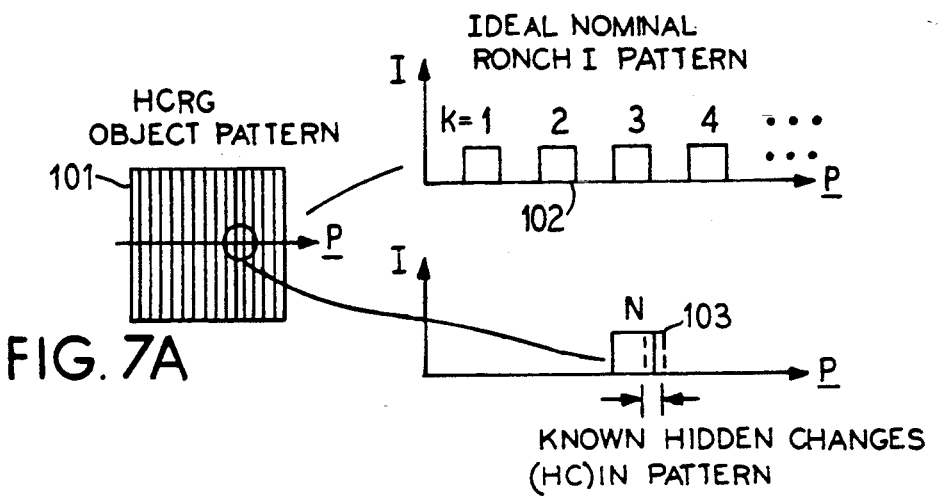
FIGS. 7A–7H illustrate the principles of operation of the fundamental embodiment of the Hidden Change Ronchi Grating (HCRG).
Figure 7B:
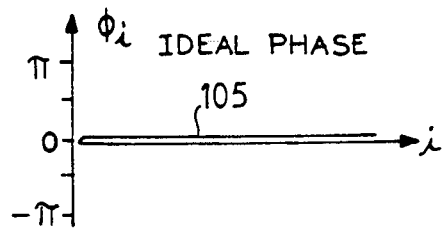
Figure 7C:
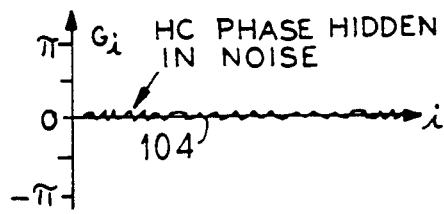
Figure 7D:
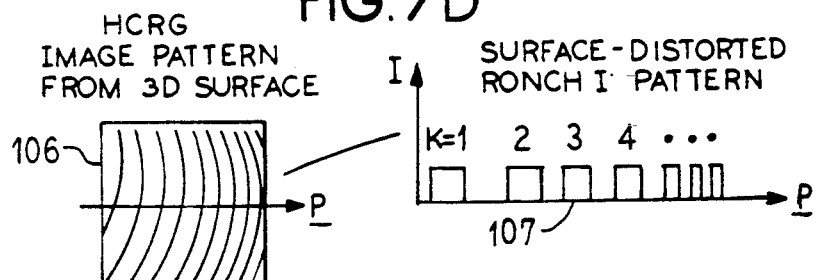
Figure 7E:
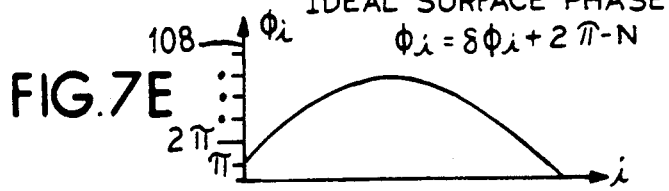
Figure 7F:
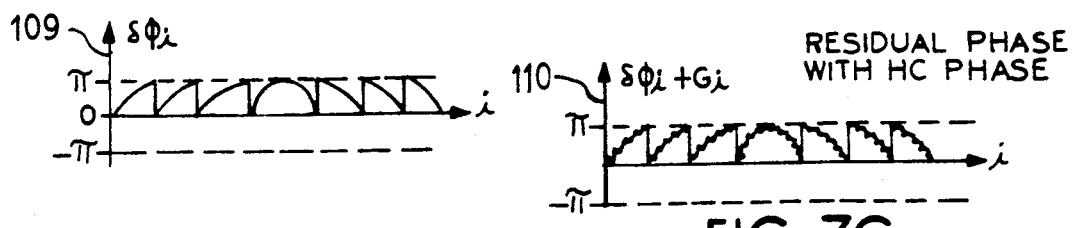
Figure 7G:
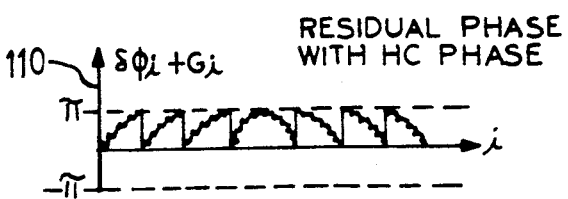
Figure 7H:
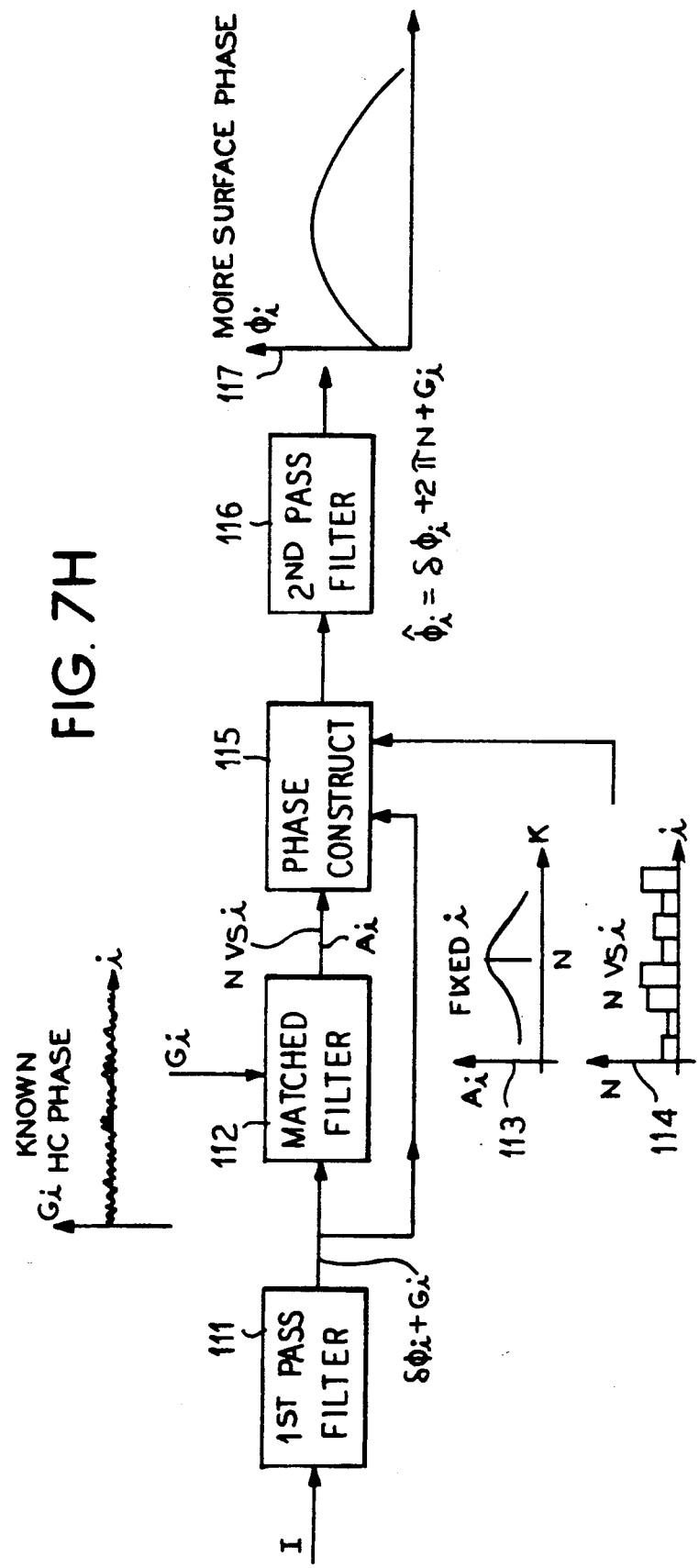

In order to accommodate the high speed Mini-Moire data generation feature and the CMM usage of the data for the high speed Train Mode and High Speed Gauge mode, a preferred embodiment of the invention for the Mini-Moire Computer Architecture is shown in FIG. 6. The Mini-Moire Computer Architecture will consist of three distinct controller/processor units and two distinct data transfer/network units. The Moire Video Controller (MVC) 81 is the primary interface to the Mini-Moire Sensor and the external controllers included the Mini-Moire white light source, the CMM controller, and the optional removable rotary table controller. The second processor is the Moire Data Processor (MDP) 82 which provides extensive processing of the X-Y-Z data and storage of that data. A Data Analysis Processor (DAP) 83 is the primary user interface for analysis, reverse engineering of the data.

The Moire Video Network (MVN) 84 is the primary connection between MVC and MDP. The Data Transfer Network (DTN) 85, is the primary transfer between the MDP and DAP. These elements are summarized as follows:

Moire Video Controller (MVC) 81
Digitizes and stores images in real time (30 frames/sec) 86
Provides "Quick-Look" Calculations for Automatic Scan Operation 87
Provides correction controls to CMM controller and Other External Controllers 88

Moire Data Processor (MDP) 82
Processes Moire Image Patterns 89
Generates raw X-Y-Z data "clouds" 90
Reduces X-Y-Z cloud data to surface model and measurement entities 90
Stores X-Y-Z cloud data base, surface model and entities 91

Data Analysis Processor (DAP) 83
CAD 92
Reverse Engineering 93
Tolerance Analysis 94
Others Moire Video Network (MVN) 84
High-Speed backplane transfer of moire images from MVC to MDP
Transfer rates do not effect MVC speeds Data Transfer Network (DTN) 85
High-Speed X-Y-Z data and entity transfer from MDP to DAP
Transfer rates do not effect MDP speeds The major expense and potential performance limitation to the Mini-Moire Computer are contained in the elements of the MDP 82. However this architecture permits the high-speed characteristics of the MVC 81, and CMM mechanical moves to continue as if ideal components for the MDP were available. The MDP 82, is designed to process stored digital imagery and to "catch up" during natural lulls in the manufacturing/measurement process such as part loading/unloading, etc. As the component capabilities of the MDP Item 2 improve, the processing algorithms can also improve to achieve greater performance goals for the HCRG and HCRM fringe patterns in order to achieve higher resolution X-Y-Z measurements. The Mini-Moire Computer Architecture permits the resultant "slow down" of the MDP 82, relative to the MVC 81, and provides an implementation path for additional higher performance components for the MDP 82. Similarly the architecture permits independent developments in work stations and image digitizers to be incorporated into the DAP 83, and MVC 81 as upgrades without effecting the critical MDP functions.

The invention of the Hidden Change Ronchi Grating (HCRG) and the Hidden Change Ronchi Matrix (HCRM) is a subset of a broader class of gratings, including sinusoidal, trapezoidal, etc., known as Hidden Change Distribution Gratings (HCDG's) and Hidden Change Distribution Matrices (HCDM's). The general processing and design of these gratings are set forth below. FIGS. 7A-7H illustrate the concept of one of the preferred embodiments used in the Mini-Moire Sensor HCRG. The HCRG object pattern 101, is a Ronchi grating with two components: the ideal nominal Ronchi pattern 102, and the small statistical variations in the pattern frequency 103. These are known as Hidden Changes (HC) and are designed so that the phase calculations associated with the pattern changes are not only unique, but hidden in the noise of the moire process 104. This moire processing noise is dependent on CCD noise, optical quality, projector illumination power, and part surface characteristics. The phase 105 for the ideal nominal Ronchi pattern is zero. The HCRG is designed so that it is to obtain phase information of the highest resolution and highest accuracy possible associated with any grating pattern. In such patterns, moire interferometric processing techniques lose count of the pattern lines $k = 1,2,3, \ldots$ The theory of the HCRG permits the introduction of hidden statistical changes in the pattern 103, such that the changes are not readily observable at any single pixel i in the measurement process. When the HCRG object pattern 101, is projected onto a surface it is distorted into an HCRG image 106. The intensity of a single cross-section 107 which appears sinusoidal in the Mini-Moire Optics, contains distortions according to an ideal surface phase 108. This ideal surface phase $(i,j,\phi_i)$ is directly relatable to the 3D surface information $(X_i, Y_i, Z_i)$ through a one-to-one map that is predetermined. The ideal surface phase $\phi_i$ 108, contains a $2\pi$ modulus N. Consequently the interferometric processing only generates the residual phase $\delta\phi_i$, ranging between $\pm\pi$. The HCRG grating also introduces the Hidden Change Phase (HC Phase) $G_i$ 104, superimposed on this residual phase $\delta\phi_i$ 110. This HC Phase $G_i$ occurs at each pixel i, but it is so small that it cannot be directly measurable and relatable to a Ronchi pattern line number k. Therefore this invention includes the method of recovering the pattern location in utilizing the fundamental theories of hidden signal recovery techniques such as discussed in the classical reference: Helstrom, Carl W., *Statistical Theory of Signal Detection*, Pergamon Press, NY 1960. This invention includes a noise-optimal processing technique for the HCRG. The image intensity 107, is passed through a First Pass Filter 111, to generate the residual phase plus hidden pattern phase 110. This signal or its functions are in turn processed by the matched filter 112. The matched filter uses as its reference the known HC Phase 113. The output of the matched filter 112, is the unique autocorrelation function $A_i$113, of the HC Phase $G_i$. Its peak at the location of the $2\pi$ modulus N for the particular i pixel being processed. A N modulus map 114, is thus available for every pixel of interest in the moire sensor field-of-view. From this information, the phase is reconstructed 115, to generate the full surface phase $\phi_i$. For a well designed HCRG pattern, the effect of the HC Phase $G_i$ should be negligible at this point. However, the HCRG design theory permits larger hidden change phases to occur which would require the use of a Second Pass Filter 116, to remove its effect on the final surface phase estimate 117. The one-to-one map from $i,j,\phi_i$ to $X_i,Y_i,Z_i$ is then used to generate the part cloud data. An important feature of the HCRG invention is that the $2\pi$ modulus N can potentially be calculated for every pixel i,j in the camera field-of-view and not be limited to conventional optical tags or fiducial mark locations which require surface continuity between marks. These conventional tagging techniques also destroy the high resolution moire data in the vicinity of the marks; a condition avoided by the HCRG. The design parameters for both the grating and the processing algorithm are a function of the noise levels in the Mini-Moire sensor and will now be explained in more detail.

The following theory of HCDG Processing and Design is presented as an example of how a single CCD snapshot of an HCDG fringe pattern image can be processed simultaneously to extract the high resolution part surface data and to solve the 290 Problem. Since the HCDG is a linear fringe pattern with fringe length along the direction j, the following analysis is along the cross-section in the direction i (expressible in terms of the intensities of a single row of detectors in the CCD array). For an ideal high resolution grating of period $P_o'$ which can be treated as the nominal or statistical mean pattern for the HCDG, the intensity expression is given by:

$$I_i^* = a + b \cos\left(\frac{2\pi}{p_o} i + \phi_i^*\right) \tag{1}$$

where $I_i^*$ = "Ideal" Nominal Pattern intensity at pixel $i$ in the CCD array. In a typical CCD array, $i = 1, \ldots, 512$. The $j$ variable (typically $j = 1, \ldots, 480$) has been suppressed for convenience.

$a, b$ = Surface diffuse reflectance parameters. Generally unknown but slowly variable $p_o$ = Ideal grating period $\phi_i^*$ = Phase shift representing surface change for each pixel (Note: a unique predetermined transform exists between $i, j, \phi^*$ and part surface x, y, z.

The challenge of moire processing is to extract the phase $\phi_i^*$ from the image pattern of Equation 1. Note however that the intensity in Equation 1 is indistinguishable from the following:

$$I_i^* = a + b \cos\left(\frac{2\pi}{p_o} i + \delta\phi_i^*\right) \tag{2}$$

where $$\frac{-\pi}{2} < \delta\phi_i^* < \frac{\pi}{2} \quad (3)$$

$$\phi_i^* = \delta\phi_i^* + N \cdot 2\pi$$

Moire processing techniques for ideal untagged patterns will extract the "residual" phase $\delta\phi_i^*$, but not the $2\pi$ modulus N. This is referred to as the "$2\pi$ Problem".

For the HCDG, it is convenient to number the grating cycles, $k=1,2,3,\ldots$, and to treat each cycle as having period $P_k$. This can be expressed in terms of the nominal period, $p_{o'}$, as:

$$P_k = p_o + M_k \cdot p_o \quad (4)$$

where $M_k$ is the HCDG modulation coefficient for cycle k. For the case when there is no surface contribution (e.g. at a reference calibration surface), the intensity pattern for the HCDG is given as:

$$I_i' = a + b \cos\left(\frac{2\pi}{p} i - G_i\right) \quad (5)$$

where $G_i$ is the HCDG Phase Sequence ($G_i$) at every camera pixel i Its values are constant in this example over the grating cycle k (extensions to varying $G_i$ within a cycle are also possible). At each cycle k, it is convenient to define G(k) as the value of the HCDG Cycle Phase Sequence $\{G(k)\}$. $G_i$, G(k) and M(k) are related as follows:

$$G_i = G(k) \quad (6)$$

for $$k p_o \le i < (k-1) p_o \quad (7)$$

where $$G(k) = \frac{2\pi \cdot M(k)}{1 + M(k)} \quad (8)$$

where $$M(k) = M_k - M(k-1) \quad (9)$$

For small $M_k$ values, the HCDG Phase Sequence values $G_i$ can be made to be on the same order as the phase variations due to noise. That is, its standard deviation $\sigma_G$ is close to the Noise Equivalent Phase $NEQ_\phi$. Typical values for well designed moire sensor optics and low noise CCD's are $$NEQ_\phi = 2\pi/100 \quad (10)$$

$$\approx 0.06 \text{ radians}$$

Although the known random-like HCDG Phase Sequence values $G_i$ appear at the same noise level as $NEQ_{100}$, the sequence itself $\{G_i\}$ has energy distributed (generally in a statistical uniform manner) over the full HCDG. Since the $G_i$ values are known a priori, the HCDG Phase Sequence position can be extracted by a Matched Filter Processor and used to solve the $2\pi$ Problem. The noise-optimality and methodology of extracting known hidden signals is well known (Reference: Helstrom, Carl W., *Statistical Theory of Signal Detection*, Pergamon Press, NY 1960). The method of design and parametric trade-offs for this example will be discussed shortly.

When surface variations are present, Equation (5) is modified to accommodate the corresponding surface phase variations $\phi_i$:

$$I_i = a + b \cos\left(\frac{2\pi}{p_o} i + \phi_i - G_{i-u}\right) \quad (11)$$

Due to the $2\pi$ Problem, $I_i$ is indistinguishable from the contribution of the residual surface phase $\delta\phi_i$ $$I_i = a + b \cos\left(\frac{2\pi}{p_o} i + \delta\phi_i - G_{i-u}\right) \quad (12)$$

where $$\phi_i = \delta\phi_i + N \cdot 290 \quad (13)$$

Note however, that the HCDG Phase Sequence $\{G_i\}$ has also shifted by an amount u. When its value is found by the Matched Filter Processor, it can be related to N as follows:

$$N = NEAREST\ INTEGER\ (u/p_o) \quad (14)$$

where $P_o$ is the period in pixels (theoretically as low as 3, typically $5 \le p_o 23\ 10$).

Several processors will be used in the example to extract $\{\delta\phi_i\}$ and $(G_{i-u})$. Important properties that will be used are that each of the sequences are uncorrelated with respect to each other with spatial frequencies that are either at or less than the Nyguest limit frequency $1/p_o$.

The First Pass Processor will operate on the intensity sequence $\{I_i\}$ in Equation (12) to obtain the values of $\sin(\delta\phi_i - G_{i-u})$ and $\cos(\delta\phi_i - G_{i-u})$. The $S_i$ operation is defined as follows:

$$S_i = - \sum_{i'=i-p_o/2}^{i+p_o/2} \sin 2\pi/p_o\ (i + i') \cdot I_i \quad (15)$$

$$= - \overline{\sin \frac{2\pi}{p_o} (i + i') \cdot I_i^{p_o}} \quad (16)$$

The overbar is a convenient notation for summing. From Equation (12) and the uncorrelated sequence properties, it follows that $$S_i = b \sin(\delta\phi_i - G_{i-u}) \quad (17)$$

The $C_i$ operation is defined as follows:

$$C_i = \overline{\cos \frac{2\pi}{p_o} (i + i') \cdot I_i^{p_o}} \quad (18)$$

It follows that $$C_i = b \cos(\delta\phi_i - G_{i-u}) \quad (19)$$

The Matched Filter Processor will operate on the sequences and $\{S_i\}$ and $\{C_i\}$ over an Integration Length L with the objective of locating the HCDG Phase Sequence $\{G_{ii}\}$. Important properties of the HCDG Phase Sequence are:

$$|G_i| << 1 \quad (20)$$

$$\overline{G_i}^L = \sum_{i'=i-L/2}^{i+L/2} G_{i'} \approx 0 \quad (21)$$

$$\overline{G_i^2}^L = A_0 \quad (23)$$

$$\overline{G_i \cdot G_{i'}}^L = \sum_{i'=i-L/2}^{i+L/2} (G_{i'})(G_{i'+i}) \quad (24)$$

$$= A_i \quad (25)$$

$A_i$ is the autocorrelation function of $\{G_i\}$ over the Integration Length L with its peak at $i=0$. $A_0$ is a measure of the energy in the $\{G_i\}$ sequence. The objective of the Matched Filter Processor is to calculate $\{A_i\}$ and to locate its peak. The following four operations are used in this example:

$$F_{1/i} = \overline{S_i}^L \quad (26)$$

$$F_{2/i} = \overline{C_i}^L \quad (27)$$

$$F_{3/i} = \overline{G_i \cdot S_i} \quad (28)$$

$$F_{4/i} = \overline{G_i \cdot C_i} \quad (29)$$

It follows from the HCDG Phase Sequence properties of Equations (21)–(24) that $$F_{1/i} \approx b \, \overline{\sin \delta\phi_i}^L \quad (30)$$

$$F_{2/i} \approx b \, \overline{\cos \delta\phi_i}^L \quad (31)$$

$$F_{3/i} \approx b \cdot A_{i-u} \, \overline{\cos \delta\phi_i}^L \quad (32)$$

$$F_{4/i} \approx b \cdot A_{i-u} \, \overline{\sin \delta\phi_i}^L \quad (33)$$

It follows that $$A_{i-u} = \frac{F_{3/i} + F_{4/i}}{F_{1/i} + F_{2/i}} \quad (34)$$

The peak of the correlation sequence ($A_{i-u}$) occurs at $i=u$. From this and Equation (14), N can be found and the $2\pi$ Problem is solved. Note that the HCDG principle permits a value for N to be found for each pixel i and to be assigned to $\delta\phi_i$. That situation is not achievable with conventionally spaced feature-marking techniques.

The Second Pass Processor is an optional processor which will operate on $\{I_i\}$ to find the residual phase sequence $\{\delta\phi_i\}$. Two example operations are defined $$S_{2/i} = -\overline{\sin\left(\frac{2\pi}{p_o} i - G_{i-u}\right) \cdot I_i}^{p_o} \quad (35)$$

$$C_{2/i} = \overline{\cos\left(\frac{2\pi}{p_o} i - G_{i-u}\right) \cdot I_i}^{p_o} \quad (36)$$

It follows that $$S_{2/i} = b \sin \delta\phi_i \quad (37)$$

$$C_{2/i} = b \cos \delta\phi_i \quad (38)$$

The residual phase can be calculated as follows:

$$\delta\phi_i = ARCTAN(S_{2/i}/C_{2/i}) \quad (39)$$

The reconstructed phase is $$\phi_i + N \cdot 2\pi \quad (40)$$

This can be related to the "ideal" phase in Equation (1) for the nominal grating of period $P_o$.

$$\phi_i^* = \phi_i - G_{i \cdot u} \quad (41)$$

$$kp_o \leq i < (K+1)p_o \quad (42)$$

It should be pointed out that the Second Pass Processor may not be needed since the HCDG Phase Sequence values $G_i$ may be so small as not to have any appreciable effect on the $\delta\phi_i$ measurement, thus $$\delta\phi_i = ARCTAN(S_i/C_i) \quad (43)$$

If a conservative approach is taken with larger $G_i$ values taken, then the Second Pass Filter would remove its effect.

An important feature of a well designed HCDG is that the value of N is available for each pixel i in the CCD pixel row j for which the phase $\delta\phi_i$ can be calculated. This permits small part areas to be gauged as long as they subtend the Integration Length L of the HCDG Phase Sequence. Due to the noise optimality of the HCDG design, L is much smaller than the spacing of optical marks in conventional grating tagging approaches. For these conventional cases, the optical tag is initially located and then fringes are counted from that point to the measurement location of interest. A lost fringe due to noise, part flaw or other cause would create failure. The HCDG, due to its HCDG Phase Sequence distribution and autocorrelation properties, is virtually immune to these problems if enough pattern energy exists in the Integration Length L.

The design of the HCDG is based on the theory of white noise sequence generation. Many scientific software applications packages, such as FORTRAN, will have a subroutine to provide the following white noise sequence:

$$w_1, w_2, w_3, \ldots, w_m \ldots \quad (44)$$

with properties:

$$E\{w_m\} = 0 \quad (45)$$

$$E\{w_m^2\} = 1 \quad (46)$$

$$E\{w_m w_n\} = 0 \text{ for m-n} \quad (47)$$

$w_m$ Probability Distribution = UNIFORM or GAUSSIAN where $E\{\cdot\}$ denotes statistical mean.

The HCDG Phase Sequence $\{G_i\}$ is generated in the following example: The ideal high resolution grating of uniform period $P_o$ (the nominal of the HCDG) is assigned a count for each cycle (k=1,2,3, . . . ). The HCDG Cycle Phase Sequence (G(k)) will be constrained have constant values for each of these cycles. The relation between $G_i$ and G(k) is $$G_i = G(k) \text{ for } kp_o \leq i < (k+1)p_o \quad (48)$$

where typical values for $P_o$ in camera pixel space is $3 \leq p_o \leq 10$. G(k) can be permitted to change for each cycle k, although a more general case would be for change at a cycle multiple $m_o$ where the phase is denoted as the Phase Change Sequence $\{S_m\}$. The relationships are:

$$S_m = m_o \cdot G(k) \tag{49}$$

for $$m = 1, 2, 3, \ldots$$

$$m_o m + (1 - m_o) \leq k < (m_o + 1)m - m_o$$

where $$m_o = \text{cycle multiple.} \tag{50}$$

Typical values for $m_0$ are 1 or 2. For the desired variance $\sigma_G^2$ of $G_i$, the variance of $S_m$ is $$\sigma_S^2 = m_o^2 \cdot p_o^2 \cdot \sigma_G^2$$

The Phase Change Sequence $\{S_m\}$ is generated from the available white noise sequence $\{w_m\}$ in Equation (44) as follows:

$$S_m = \sigma_S \cdot w_m \tag{51}$$

$$m = 1, 2, 3, \ldots$$

The HCDG Cycle Phase values are:

$$G(k) = G(k+1) = \ldots G(k + m_o - 1) = S_m/m_o \tag{52}$$

This construction provides all the desired properties of $\{G_i\}$ in Equations (21)-(24). The autocorrelation function of $\{G_i\}$ over the integration Length L is of the form:

$$A_i = L \cdot m_o p_o \, \sigma_G^2 \left( 1 - \left| \frac{i}{m_o p_o} \right| \right) \tag{53}$$

$A_i$ is the output signal of the Matched Filter Processor and is imbedded in filtered noise with its peak value occurring at $i = u$. $u$ is related to N by Equation (14). The peak signal to filtered noise (SNR) at the processor output is given by $$SNR = \sqrt{L/p_o} \cdot (\sigma_G/NEQ_\phi) \tag{54}$$

where
$\sigma_G^2$ = Variance of HCDG Phase Sequence value $G_i$
$NEQ_\phi$ = Noise Equivalent Phase of Moire Sensor
L = Integration Length in pixels in Matched Filter Processor Summations
$p_o$ = Nominal grating period in pixels used in First Pass Processor Equation (54) can now be used to select HCDG design parameters For a "truly hidden" HCDG Phase Sequence, $(\sigma_G/NEQ_\phi) \approx 1$. Parametric values of
L = 20 pixels
$p_o$ = 5 pixels
will provide a matched filter output of SNR = 2. This is sufficient to detect the correlation peak position u. Note that its accuracy need not be at the pixel level because of the integer round-off in Equation (14). The Second Phase Processor option would not be required for this case due to the small $G_i$ values.

Note that a smaller Integration Length L is still possible to permit the gauging of even smaller part areas.

Select a larger $\sigma_G$ to achieve the following operating characteristics:

$$\sigma_G/NEQ_\phi = 2\sqrt{2} = 2.83$$

$$p_o = 5$$

$$SNR = 2$$

This results in $$L = 10.$$

The Second Pass Processor option would eliminate the "noisy" effect of the larger $G_i$ values.

The construction of the HCDG pattern now follows in a straightforward manner. Identify each cycle as $k = 1, 2, 3, \ldots$ The "zeroth" cycle is assigned the physical period $p_o$. In the treatment, the $p_k$ values are physical pattern dimensions with $p_o$ as the nominal ideal period of HCDG. Each subsequent cycle k is attached to the end of the preceding cycle $k - 1$. The general relationship is:

$$p_k = p_o(1 + M_k) \tag{55}$$

where $$M_k = M(k) + M(k-1) \tag{56}$$

and $$M(k) = \frac{G(k)/2\pi}{1 - G(k)/2\pi} \tag{57}$$

An important special case of the HCDG is the Hidden Change Ronchi Grating (HCRG) made up of clear and opaque bands. These gratings are simple to construct from white and black pattern bands. In this case the period $p_k$ in Equation (56) is divided between the white and black band that make up the kth cycle. That is:

$$\text{kth White Band Width} = p_k/2 \tag{58}$$

$$\text{kth Black Band Width} = p_k/2$$

In the design of the HCRG (and HCDG), it may be desirable from a grating pattern mask construction stated point to have only finite values or states for the phase modulated coefficient. For example if N states were permitted in the construction around the nominal period $p_o$, the resultant pattern would repeat itself in $(N-1)^M$ cycles when $M = m_o \cdot L/p_o$. For example if $N = 3$, $m_o = 2$, $p_o = 5$, $L = 10$, then the HCRG pattern would repeat itself in 16 cycles and may not be useful. If N is increased to 5, then the pattern would repeat every 256 cycle which would be more than sufficient for conventional camera CCD arrays ranging in size to $1024 \times 1024$.

Other important special cases of the HCDG and HCRG are the Minimal Change Distributed Grating (MCDG) and the Minimal Change Ronchi Grating (MCRG). In this case the "energy" of the Phase Change Sequence $G_i$ is unevenly distributed throughout the grating pattern. In the extreme, optical tag-like features would occur. Separations occur with periods $G_i=0$ for no changes and optical fiducials occur when $G_i$ is larger than normal. However the HCDG theory and its noise-optimal, matched filter, processing methods permit the "tags" to be designed to have minimal effect on data generation. The construction of the MCDG and MCRG is the same as for the HCDG and HCRG utilizing Equations (55) through (57).

The above example for the HCDG theory was for a fixed fringe method where sampling of the grating occurred across the pattern the HCDG principles also apply to the phase measurement moire technique (moving fringe methods) when sampling occurs in time as the pattern changes position.

An important class of surfaces exist that cannot be measured with the linear fixed pattern whether of the ideal Ronchi-type or HCDG-type for fixed pattern moire processing techniques. These are the sharp (knife) edges or corners that lie along the band direction vector $L_0$. This condition prevents the Ronchi grating period $P_0$ to effectively sample the edge to generate on $i,j,\phi$ map. If the edges do not fall along $L_0$ and cross a full grating period, then the $i,j,\phi$ map for the edge can be generated. Methods that resolve $L_0$-direction edge phase measurements include moving fringe patterns (phase shift moire method), adding extra projectors at an orthogonal orientation, or rotating the full camera/projector moire package. All of these methods are either time consuming, add extra size and weight, or add cost.

This invention therefore includes the extension of the linear HCDG to a Hidden Change Distribution Matrix (HCDM) form. The HCDM consists of two HCDG patterns denoted as "Pattern 0" and "Pattern 1" (generally orthogonal to each other) with fundamental Ronchi periods $P_0$ and $P_1$ and band directions $L_0$ and $L_1$. An important special case is the Hidden Change Ronchi Matrix (HCRM). The design and analysis for the HCRM is the same as for the HCRG except that two band and panel patterns are generated. Ronchi matrix forms have been impractical in the prior art for high resolution x,y,z measurements for moire processing techniques because of the serious spatial resolution degradation of Pattern 0 by Pattern 1. This is particularly true if both patterns are of 50% duty cycle (equal width opaque and transparent bands). However for the Mini-Moire Sensor, Pattern 0 is to be the dominant pattern and Pattern 1 is only used for $L_0$-direction edge measurements. In general, Pattern 0 will have 50% duty cycle Ronchi periods of $p_0$ while Pattern 1 will have larger Ronchi periods $p_1$ and smaller duty cycles (e.g. 10% opaque and 90% transparent) with the HCRM construction rule:

Transparent$_0$·Transparent$_1$ = Transparent (59)

Opaque$_0$·Transparent$_1$ = Opaque

Transparent$_0$·Opaque$_1$ = Opaque

OPaque$_0$·Opaque$_1$ = Opaque

As for the HCDG, the construction of the HCDM applies to sinusoidal patterns, trapezoidal patterns, etc.

The HCDM will significantly reduce the physical size of a moire sensor and simplify the sensor processor if properly installed. The HCDM is installed in the same optical position as the HCDG at angle $\mu_0$ between projector and camera line-of-sights. However the HCDM is then rotated an angle $\Theta$ to insure that the following triangulation requirements hold:

$$L_0^T(LOS_c \times LOS_p) = C_0 = 0 \qquad (60)$$

$$L_1^T(LOS_c \times LOS_p) = C_1 = 0$$

Where $LOS_c$ and $LOS_p$ are the line-of-sight vectors for the moire camera and projector. Generally $C_0 > C_1$, since Pattern 0 is the dominant pattern for the Mini-Moire Sensor. If the CCD array is also rotated an angle e so that its i,j grid lines up with the HCDM $v_0$, $v_1$ pattern directions, then the computer processing for the $i,j,\phi$ map is simplified due to near decoupling in the i,j directions, thereby permitting lower costs and higher speeds.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A high-speed three-dimensional surface measurement system for use in determining the surface of an object from at least one electronic signal using a moire process, comprising:

at least first means for illuminating at least a surface area of the object with at least one fringe pattern, said at least first means for illuminating having optical grating means for producing said at least one fringe pattern, said optical grating means consisting of a nominal pattern having a pattern frequency and small statistical variations in the pattern frequency such that phase calculations associated with the variations are unique and hidden in noise of the moire process;

at least one means for receiving reflected illumination from said surface area, said at least one means for receiving reflected illumination providing an electronic signal representative of reflected illumination received thereby; and means for determining a surface phase of the surface are of the object from the electronic signal by utilizing the phase calculations associated with the variations in the pattern frequency, the surface phase being representative of the surface area of the object.

2. The system according to claim 1, wherein said optical grating means is a pseudo-random grating pattern in which a nominal fringe pattern has a small uniform period with the hidden variations distributed statistically across said optical grating means.

3. The system according to claim 2, wherein said at least one means for receiving has a noise equivalent phase value and wherein said hidden variations are so small that at any one point on the optical grating means a noise-like value of said hidden variations in one the order of said noise equivalent phase value of said at least one means for receiving.

4. The system according to claim 1, wherein energy of the hidden variations is distributed substantially evenly over said optical grating means.

5. The system according to claim 1, wherein energy of the minimal variations is distributed unevenly over said optical grating means.

6. The system according to claim 1, wherein said optical grating means has first and second hidden change distribution gratings oriented at right angles to one another.

7. The system according to claim 1, wherein said optical grating means has first and second polarization sensitive hidden change distribution gratings and wherein said system further comprises means for individually polarizing said first and second polarization sensitive hidden change distribution gratings to thereby separately produce first and second patterns.

8. The system according to claim 7, wherein each of said first and second polarization sensitive hidden change distribution gratings has a respective controllable light source.

9. The system according to claim 1, wherein said optical grating means is a Ronchi grating.

10. The system according to claim 1, wherein said optical grating means has first and second hidden change Ronchi gratings oriented at right angles to one another.

11. The system according to claim 10, wherein said system further comprises mean for rotating said optical grating means through a predetermined angle to insure sufficient triangulation between said at least one first means for illuminating and said at least one means for receiving illumination.

12. The system according to claim 10, wherein said system further comprises means for rotating said at least one means for receiving illumination through a predetermined angle to insure sufficient triangulation between said at least one first means for illuminating and said at least one means for receiving illumination.

13. The system according to claim 1, wherein said optical grating means has first and second polarization sensitive hidden change distribution gratings and wherein said system further comprises means for individually polarizing said first and second polarization sensitive hidden change distribution gratings to thereby produce first and second patterns.

14. The system according to claim 13, wherein each of said first and second polarization sensitive hidden change distribution gratings has a respective controllable light source.

15. The system according to claim 13, wherein said system further comprises means for rotating said optical grating means through a predetermined angle to insure sufficient triangulation between said at least first means for illuminating and said at least one means for receiving illumination.

16. The system according to claim 13 wherein said predetermined angle is in the range of 0° to 45° for a pattern of said first and second patterns for use on objects having knife edges.

17. The system according to claim 13, wherein said predetermined angle is in the range of 0° to 30° for a pattern of said first and second patterns for use on objects in general.

18. The system according to claim 1, wherein said system further comprises second means for illuminating at least said surface area of the object for providing two dimensional information to said at least one means for receiving reflected illumination.

19. Method for determining the surface of an object using a mini-moire sensor and a moire process, comprising the steps of:
provide an optical grating means consisting of a nominal pattern having a pattern frequency and small statistical variations in the pattern frequency such that phase calculations associated with the variations are unique and hidden in noise of the moire process;
projecting the pattern onto a surface area of an object; recording an image intensity of the pattern projected on the surface area;
passing the image intensity through a first pass filter to generate a residual phase plus hidden pattern phase;
processing the generated residual phase plus hidden pattern phase in a matched filter that uses a known hidden change phase as a reference to produce a unique autocorrelation function;
providing an N modulus map for substantially every pixel in at least a portion of a field-of-view of the moire sensor; and
determining a surface phase of the surface area of the object phase from the residual phase plus hidden pattern phase, the autocorrelation function and the N modulus map, the surface phase being representative of the surface area of the object.

20. The method according to claim 19, wherein the method further comprises using a second pass filter to remove the hidden change phase from the surface phase.

21. The method according to claim 19, wherein a $2\pi$ modulus N is calculated for substantially every pixel in at least a portion of a field-of-view relative to the object.

22. The method according to claim 19, wherein grating means is a hidden change distribution grating.

23. The method according to claim 19, wherein said optical grating means is a hidden change distribution matrix means.

24. The method according to claim 19, wherein said optical grating means is a hidden change Ronchi grating.

25. A high-speed three-dimensional surface measurement system for determining the surface of an object using a moire process, comprising:
a mini-moire sensor having a hidden change Ronchi grating consisting of a nominal Ronchi pattern having a pattern frequency and small statistical variations in the pattern frequency such that phase calculations associated with the variations are unique and hidden in noise of the moire process;
said mini-moire sensor having means for projecting the pattern onto a surface area of an object;
said mini-moire sensor having means for recording an image intensity of the pattern projected on the surface area;
means for passing the image intensity through a first pass filter to generate a residual phase plus hidden pattern phase;
means for processing the generated residual phase plus hidden pattern phase in a matched filter that uses a known hidden change phase as a reference to produce a unique autocorrelation function;
means for providing an N modulus map for substantially every pixel in at least a portion of a field-of-view of the moire sensor; and
means for determining a surface phase of the surface area of the object phase from the residual phase plus hidden pattern phase, the autocorrelation function and the N modulus map, the surface phase being representative of the surface area of the object.

26. The system according to claim 25, wherein said system further comprises a second pass filter for removing the hidden change phase from the surface phase.

27. An upgrade for a coordinate measuring machine for high-speed surface measurement of the surface of an object using a moire process, the coordinate measuring machine having at least a pan/tilt head, comprising:

a mini-moire sensor attached to the pan/tilt head of the coordinate measuring machine;

said moire sensor having at least first means for illuminating at least a surface area of the object with at least one fringe pattern, said at least first means for illuminating having optical grating means for producing said at least one fringe pattern, said optical grating means consisting of a nominal pattern having a pattern frequency and small statistical variations in the pattern frequency such that phase calculations associated with the variations are unique and hidden in noise of the moire process, and said moire sensor also having a single means for receiving reflected illumination from said surface area, said at least one means for receiving reflected illumination providing an electronic signal representative of reflected illumination received thereby; and means for determining the three-dimensioned surface configuration of said surface area of the object from said electronic signal by utilizing the phase calculations associated with the variations in the pattern frequency;

wherein said coordinate measuring machine has at least one mode wherein said mini-moire sensor continuously scans the object.

28. The upgrade according to claim 27, wherein said upgrade further comprises a removable rotary table in the coordinate measuring machine and on which the object is supported, and wherein said rotary table eliminates extensive X-axis and Y-axis motions of the coordinate measuring machine.

29. The upgrade according to claim 27, wherein said upgrade further comprises means for providing an operator with a video display of the surface area of the object, said means for providing having a quick look display/operator interface.

30. The method according to claim 27, wherein the method further comprises the steps of: initially automatically scanning the object with said mini-moire sensor to generate a full X-Y-Z data surface map of the object and storing said full X-Y-Z data surface map; and generating specific measurements of the object from the determined three-dimensional surface configuration and said stored full X-Y-Z data surface map.

31. A high-speed three-dimensional surface measurement system for use in determining the surface of an object from at least one electronic signal using a moire process, comprising:

mini-moire sensor having at least first means for illuminating at least a surface area of the object with at least one fringe pattern, said at least first means for illuminating having optical grating means for producing said at least one fringe pattern, said optical grating means consisting of a nominal pattern having a pattern frequency and small statistical variations in the pattern frequency such that phase calculations associated with the variations are unique and hidden in noise of the moire process, and also having a single means for receiving reflected illumination from said surface area, said at least one means for receiving reflected illumination providing an electronic signal representative of reflected illumination received thereby;

means for processing said electronic signal by utilizing the phase calculations associated with the variations in the pattern frequency to provide at least a storable X-Y-Z image of the surface area of the object; and means for moving said mini-moire sensor in order to scan the object.

32. The system according to claim 31, wherein said system further comprises second means for illuminating at least said surface area for providing two dimensional information to said means for receiving reflected illumination.

33. The system according to claim 31, wherein said system further comprises means for producing strobed illumination in said first means for illumination.

34. The system according to claim 31, wherein said single means for receiving reflected illumination is a CCD camera having a CCD array and wherein camera electronics associated with said CCD camera have at least one electronic shutter for freezing an image into the CCD array.

35. The system according to claim 31, wherein said means for processing has:

moire video controller means for interfacing with and controlling at least said mini-moire sensor and for forming X-Y-Z data from the electronic signal from the moire sensor;

moire data processor means for processing the X-Y-Z data derived from the electronic signal from the moire sensor;

data analysis processor means for user analysis of the X-Y-Z data;

moire video network means for connecting the moire data processor means to the moire video controller means; and data transfer network means for connecting the data analysis processor means to the moire data processor means.

* * * * *